US012633029B2

(12) United States Patent
Nguyen

(10) Patent No.: US 12,633,029 B2
(45) Date of Patent: May 19, 2026

(54) METHOD OF FORMING A THREE-DIMENSIONAL IMAGE

(71) Applicant: ams-OSRAM Asia Pacific Pte. Ltd., Singapore (SG)

(72) Inventor: Ho Hoai Duc Nguyen, Munich (DE)

(73) Assignee: ams-OSRAM Asia Pacific Pte. Ltd., Singapore (SG)

( * ) Notice: Subject to any disclaimer, the term of this patent is extended or adjusted under 35 U.S.C. 154(b) by 441 days.

(21) Appl. No.: 18/556,382

(22) PCT Filed: Apr. 21, 2022

(86) PCT No.: PCT/SG2022/050241
§ 371 (c)(1),
(2) Date: Oct. 20, 2023

(87) PCT Pub. No.: WO2022/225463
PCT Pub. Date: Oct. 27, 2022

(65) Prior Publication Data
US 2024/0203022 A1     Jun. 20, 2024

(30) Foreign Application Priority Data

Apr. 21, 2021     (GB) ..................................... 2105701

(51) Int. Cl.
*G06T 15/00*          (2011.01)
*G06T 7/62*           (2017.01)
(Continued)

(52) U.S. Cl.
CPC ................ *G06T 15/00* (2013.01); *G06T 7/62* (2017.01); *G06T 7/70* (2017.01); *G06V 10/141* (2022.01);
(Continued)

(58) Field of Classification Search
None
See application file for complete search history.

(56) References Cited

U.S. PATENT DOCUMENTS

| 5,838,428 | A | * | 11/1998 | Pipitone | ................. | G01S 17/46 |
| | | | | | | 356/616 |
| 8,295,547 | B1 | * | 10/2012 | Cangiani | ................. | G01S 17/66 |
| | | | | | | 382/103 |

(Continued)

FOREIGN PATENT DOCUMENTS

| GB | 2579689 A | 7/2020 |
| KR | 1020180049930 A | 5/2018 |

(Continued)

OTHER PUBLICATIONS

British Search Report for corresponding British patent application No. GB 2105701.3, dated Aug. 26, 2021, 4 pages (for informational purposes only).

(Continued)

*Primary Examiner* — David H Chu

(74) *Attorney, Agent, or Firm* — Viering, Jentschura & Partner mbB

(57)                      ABSTRACT

A method of forming a three-dimensional image includes, first, capturing a first image of a field of view and then, subsequently, capturing range information. The method further includes forming the three-dimensional image, wherein the three-dimensional image is dependent on the first image. Capturing the first image of a field of view includes: illuminating the field of view with radiation; and determining an intensity of each of a plurality of pixels of reflected radiation from the field of view. Capturing the range information includes: illuminating the field of view with radiation; and determining a time delay of reflected radiation from the field of view for each of a plurality of pixels.

19 Claims, 5 Drawing Sheets

(51) Int. Cl.
    *G06T 7/70*           (2017.01)
    *G06V 10/141*     (2022.01)
    *G06V 10/60*      (2022.01)

(52) U.S. Cl.
    CPC .......... G06V 10/60 (2022.01); *G06V 2201/07*
                                (2022.01)

(56)             References Cited

U.S. PATENT DOCUMENTS

| | | | |
|---|---|---|---|
| 2014/0028804 | A1 | 1/2014 | Usuda et al. |
| 2014/0071234 | A1* | 3/2014 | Millett ................. H04N 13/271 |
| | | | 348/43 |
| 2016/0007009 | A1 | 1/2016 | Offenberg |
| 2016/0245920 | A1 | 8/2016 | Boufounos et al. |
| 2017/0330364 | A1* | 11/2017 | Yamamoto ................ G06T 1/00 |
| 2018/0068206 | A1* | 3/2018 | Pollach .................. G06V 20/56 |
| 2018/0260967 | A1* | 9/2018 | Bleyer .................... G06T 7/557 |
| 2019/0125215 | A1* | 5/2019 | Swanson ................... G06T 7/62 |
| 2019/0171892 | A1* | 6/2019 | Barth ................... G06V 10/454 |
| 2019/0235054 | A1* | 8/2019 | Ratner .................... G01S 17/42 |
| 2020/0059638 | A1* | 2/2020 | Banks ................. H04N 13/204 |
| 2020/0309957 | A1* | 10/2020 | Bhaskaran .............. G01S 17/86 |
| 2020/0349338 | A1* | 11/2020 | Lagmanson ....... A61N 1/37229 |
| 2021/0103055 | A1 | 4/2021 | Allen et al. |
| 2021/0208259 | A1* | 7/2021 | Chung .................... G01S 17/89 |
| 2021/0327092 | A1* | 10/2021 | Jiang ..................... B60W 40/02 |
| 2023/0273300 | A1* | 8/2023 | Huang ................... G01S 17/08 |
| | | | 356/5.01 |

FOREIGN PATENT DOCUMENTS

| | | | |
|---|---|---|---|
| WO | 2017011171 | A1 | 1/2017 |
| WO | 2019164500 | A1 | 8/2019 |

OTHER PUBLICATIONS

International Search Report for corresponding International Patent Application No. PCT/SG2022/050241, dated Jul. 27, 2022, 4 pages (for informational purposes only).

\* cited by examiner

METHOD OF FORMING A THREE-DIMENSIONAL IMAGE

RELATED APPLICATION(S)

This application is a US National Stage Application of International Application PCT/SG2022/050241, filed on 21 Apr. 2022, and claims priority under 35 U.S.C. § 119(a) and 35 U.S.C. § 365(b) from United Kingdom Application GB 2105701.3, filed on 21 Apr. 2021, the contents of which are incorporated herein by reference in their entirety.

TECHNICAL FIELD

The present disclosure relates to a method of forming a three-dimensional image, particularly but not exclusively, to a method for use in a LIDAR ("light detection and ranging" or "laser imaging detection and ranging") system. The disclosure also relates to an associated apparatus for performing the method. The method may, for example, find application in a LiDAR system for an autonomous vehicle.

BACKGROUND

The present disclosure relates to a method of forming a three-dimensional image and an associated apparatus operable to implement the method. In particular, the present disclosure relates to methods and apparatus for use in a LIDAR system.

A LIDAR system comprises a radiation source (for example a laser) that is operable to emit radiation so as to illuminate a field of view and a sensor operable to measure a portion of the emitted radiation that is reflected from objects disposed in the field of view. The radiation source may comprise a laser diode, which could, for example, be an edge emitter array or a vertical-cavity surface-emitting-laser (VC SEL) array. The sensor may comprise various radiation sensitive technologies, including silicon photomultipliers (SiPM), single-photon avalanche diodes (SPAD), complementary metal-oxide-semiconductors (CMOS) or charged-coupled devices (CCD). The sensor may comprise a one-dimensional or two-dimensional array of sensing elements.

The LiDAR system further comprises focusing optics, which are arranged to form an image of the field of view on the sensor. The field of view may be divided into a plurality of pixels, each pixel corresponding to a different solid angle element. The focusing optics may be arranged to focus radiation received from the solid angle element of each pixel to a different region in a plane of the sensor. The division of the field of view into a plurality of pixels may be achieved at least partially achieved by the division of the sensor into a plurality of separate sensing elements. That is, radiation received from a given pixel of the field of view may be received by a single sensing element of the sensor.

Some LiDAR systems comprise a rotatable mirror or the like and illumination of the field of view may be achieved by rotating said rotatable mirror. For example, the radiation source may be operable to illuminate only a portion of the field of view in a first direction (for example only one pixel or only one column of pixels) and rotation of the rotatable mirror may vary the position of the illuminated portion of the field of view in the first direction. For such arrangements, the radiation source may be operable to illuminate the entire field of view in a second direction that is perpendicular to the first direction (i.e. for a fixed orientation of the rotatable mirror a whole column of pixels, extending in the second direction, may be illuminated). By rotating the mirror through a sufficient range of orientations, the entire field of view may be illuminated in the first direction. With such an arrangement, a plurality of strips of the field of view can be illuminated successively. For such LiDAR systems the sensor may comprise a one dimensional array of sensing elements that is arranged to receive reflected radiation from each of the plurality of strips of the field of view successively (i.e. to receive reflected radiation from each column of pixels successively). With such an arrangement, each sensing element in the one dimensional array may be operable to receive radiation from an entire row of pixels of the field of view (each pixel in the row being determined successively by said sensing element). Alternatively, the sensor may comprise a two dimensional array of sensing elements that is arranged to receive reflected radiation from the entire field of view and which two dimensional array comprises a plurality of individually addressable rows or columns so that reflected radiation from each of the plurality of strips of the field of view can be successively measured. With such an arrangement, each sensing element in the two-dimensional array may be operable to receive radiation from a single pixel of the field of view.

If reflected radiation is received by the sensor from a given pixel of the field of view then it may be determined that an object is disposed in the solid angle element corresponding to that pixel. Furthermore, by determining a time delay between emission of radiation into that solid angle element and the reflected radiation received by the sensor, a distance of said object from the LiDAR system can be determined. In this way, a three-dimensional image of objects in the field of view can be determined. A LIDAR system may be operable to determine a three-dimensional image of objects in the field of view periodically. The time between subsequent measurements may be referred to as a time period of the LiDAR.

LIDAR systems have many applications, one example being for use in autonomous vehicles. As an autonomous vehicle moves it may periodically determine a three-dimensional image of objects in the field of view of a LIDAR and, from this it may determine whether or not there are any obstacles in a trajectory of the vehicle. In this way, the risk of the vehicle colliding with an object may be reduced or even removed completely.

Some problems associated with such known LiDAR systems are now discussed.

Although the sensor may comprise any one of a plurality of different light sensitive detectors, single-photon avalanche diodes (SPADs) are particularly advantageous since they have extremely high sensitivity. In particular, the leading edge of the avalanche pulse gives an accurate time of arrival measurement for the LiDAR system. However, this high sensitivity also results in serious limitations of SPADs. For example, upon receipt of a sufficiently large number of photons, SPADs can saturate such that the SPAD avalanche signal cannot quench in time and therefore the SPAD is not ready to detect a signal for the next measurement. If any of the sensing elements in a SPAD array saturate then these sensing elements are effectively frozen until the intensity of photons drops sufficiently for the avalanche signal to quench. If this occurs, then any pixels in the field of view that should be detected by the saturated sensing element(s) cannot be detected. If the LiDAR is being used by an autonomous vehicle then this can result in blind spots, which are unacceptable. If any part of the sensor for a LIDAR system is being used by an autonomous vehicle saturates then the vehicle may need to stop in order to avoid the risk of collision.

Another challenge with LiDAR systems is stray light. This may comprise radiation that is emitted by the laser source of the system and which is incident upon the sensor without having been reflected from an object within the field of view. This background signal can make it difficult to correctly identify objects within the field of view, especially in co-axial systems.

It is an aim of the present disclosure to provide a method of forming a three-dimensional image (and an associated apparatus) that may be suitable for use in a LIDAR system and which addresses one or more of problems associated with prior art arrangements, whether identified above or otherwise.

SUMMARY

In general, this disclosure proposes to overcome the above problems by employing a two stage measurement process. As a first stage, a grayscale image of the field of view is determined. As used here, a grayscale image of the field of view is intended to mean a time-integrated intensity of radiation received by the entire sensor following illumination of the field of view by the radiation source. As a second stage, the field of view is illuminated and a time delay of reflected radiation from the field of view for each of a plurality of pixels is determined. Rather than determining a three-dimensional image of objects in the field of view only from the time delay of reflected radiation from the field of view for each of the pixels, this disclosure proposes to form the three-dimensional image from both this captured range information and the grayscale image. For example, the grayscale image may be a grayscale image taken with no objects in the field of view (within range of the LiDAR system) and therefore may characterize a stray light background that may be at least partially corrected for. Additionally or alternatively, the grayscale image may be a grayscale image taken of the field of view. Advantageously, as will be discussed in more detail below, this can allow the system to avoid saturation of the sensing elements under certain conditions.

According to a first aspect of the present disclosure, there is provided a method of forming a three-dimensional image, the method comprising: capturing a first image of a field of view by: illuminating the field of view with radiation; and determining an intensity of each of a plurality of pixels of reflected radiation from the field of view; and subsequently capturing range information by: illuminating the field of view with radiation; and determining a time delay of reflected radiation from the field of view for each of a plurality of pixels; and forming the three-dimensional image; wherein the three-dimensional image is dependent on the first image.

The method according to the first aspect may be for use in for a LiDAR system.

As described further below, a system implementing the method according to the first aspect allows both: for saturation of sensing elements of the system to be avoided under certain conditions; and for a stray light background to be at least partially corrected for.

The first image be an image of the same field of view as the field of view, which is used for capturing the range information. Alternatively, the first image be an image of a different field of view to the field of view, which is used for capturing the range information.

In some embodiments a plurality of three-dimensional images may be formed in succession. In this way a three-dimensional moving image, movie or video can be formed, with each frame comprising a three-dimensional image formed according to the method of the first aspect. In some embodiments, a first image may be captured before each set of range information and three-dimensional images is determined. That is, a first image may be captured at the start of each frame. Alternatively, in some embodiments, once the first image is captured a plurality of sets of range information and three-dimensional images may be determined. That is, a first image may be captured once and subsequently used in the forming of a plurality of frames.

The radiation used to illuminate the fields of view for capturing the first image and the range information may be generated by the same radiation source. The radiation used to illuminate the fields of view for capturing the first image and the range information may have the same intensity. Alternatively, the radiation used to illuminate the field of view for capturing the first image may be of lower intensity than the radiation used to illuminate the field of view for capturing the range information.

The first image of a field of view is a two-dimensional image. The first image of a field of view is a time integrated image (i.e. the first image does not contain timing information). The first image of a field of view may be referred to as a global image or a grayscale image.

Capturing the range information may further comprise determining an intensity (in addition to a time delay of) the reflected radiation from the field of view for each of a plurality of pixels.

It will be appreciated that each of the plurality of pixels of the first image corresponds to a solid angle element of the field of view. It will be appreciated that each of the plurality of pixels of the range information corresponds to a solid angle element of the field of view. In some embodiments, each of the pixels of the first image corresponds to a different one of the plurality of pixels of the range information (for example as a one-to-one mapping). This may be achieved, for example, by using the same apparatus (for example optics and sensor array) for capturing both the first image and the range information.

The three-dimensional image may be directly or indirectly dependent on the first image, as now explained.

Capturing the range information may be dependent on the first image and the three-dimensional image may be formed from the captured range information.

For such embodiments the three-dimensional image is indirectly dependent on the first image.

The inventors have realized that any object that is disposed in the field of view and which is sufficiently close to the apparatus that is capturing the first image and the range information will be out of focus and will therefore form a large image in the first image. Furthermore, since such an object is relatively close to the apparatus that is capturing the first image and the range information, the intensity of radiation reflected from said object will, in general, be large. Therefore, the presence of such an object close to the apparatus can influence a significant number of pixels and, furthermore, can cause the sensing elements for these pixels to saturate such that they are frozen while this object remains close to the apparatus.

For example, for capturing the first image and the range information, a sensor array and focusing optics may be used and the focusing optics may be arranged to form an image of the field of view in a plane of the sensor array. The sensor array may, for example, be focused on a hyperfocal plane of the focusing optics since such an arrangement maximizes the depth of field of the system. This may ensure that any objects that are more than half the hyperfocal distance from the focusing optics are brought to an acceptable focus. However, any objects that are less than half the hyperfocal distance from the focusing optics will, in general, be out of focus.

For example, in some systems, if there is an object within 3 m of the focusing optics this can cause a significant portion of the sensing array to saturate. For example, such an object could extend across hundreds of pixels of a sensing array (for example an area of the sensing array having radius of the order of tens of pixels). For some systems (for example those using an array of SPADs for determining the range information), upon receipt of a sufficiently large number of photons, the sensing elements can saturate such that the sensing element is not ready to detect a signal for the next measurement (for example the next frame). If any of the sensing elements saturate then these sensing elements are effectively frozen and, as a result, any pixels in the field of view that should be detected by the saturated sensing element(s) cannot be detected. If the LiDAR is being used by an autonomous vehicle then this can result in blind spots, which are unacceptable. If any part of the sensor for a LIDAR system is being used by an autonomous vehicle saturates then the vehicle may need to stop in order to avoid the risk of collision.

Thus, some embodiments of this disclosure provide a method of forming a three-dimensional image wherein, first, a first image of the field of view is captured (for example at the start of each frame) and this is used in the subsequent capture of the range information. In particular, in some embodiments the first image is used to at least partially correct for the potentially large influence of objects that are close to the apparatus capturing the range information. Advantageously, this may involve delaying the monitoring of reflected radiation until the radiation reflected by the close object(s) has passed such that it does not cause parts of the sensing array to saturate.

Other solutions for dealing with such close objects may include: reducing the intensity of the radiation used for illuminating the field of view upon saturation of part of the sensing array; or blocking of attenuating reflected radiation that re-enters the sensing system upon saturation of part of the sensing array. Compared to such known systems, the present method according to the first aspect disclosed here has the following advantages. First, it allows for saturation to be avoided without loss of range and/or performance that results from reducing the intensity of the radiation used for illuminating the field of view or blocking or attenuating the reflected radiation before it is incident on the sensing array. Second, in contrast to the method according to the first aspect disclosed here, such alternative solutions cannot allow for stray light to be corrected for, which can result in false positive detections of objects in the field of view. The correction of stray light using the method according to the first aspect disclosed here is discussed further below.

The method may further comprise analyzing the first image to determine the presence within the field of view of any objects that are larger than a threshold size. Determining a time delay of reflected radiation from the field of view for each of the plurality of pixels may be dependent upon whether or not an object that is larger than the threshold size is identified in the first image.

The analysis of the first image may also include determining a position within the field of view of any objects that are larger than the threshold size. Determining a time delay of reflected radiation from the field of view for each pixel may be dependent upon whether or not an object that is larger than the threshold size is identified in the first image that overlaps with the corresponding pixel of the first image or a pixel of the first image that corresponds to a row or column of pixels to which the pixel belongs.

In some embodiments, a two-dimensional sensor array may be used. This sensor array may be used to capture a rolling shutter image or raster scan type image for the range information wherein each row or column of the array is activated sequentially to determine a strip of pixels at a time. For such embodiments, each row or column of the array is activated may be considered to be a set of pixels. For such embodiments, if an object that is larger than the threshold size is identified in the first image that overlaps with any of the corresponding pixels of that row or column then a suitable time delay may be introduced for the capturing of that row or column of pixels.

The method may further comprise: generating a warning signal if any objects that are larger than the threshold size are identified in the first image.

The may further comprise: initiating a safety process if any objects that are larger than the threshold size are identified in the first image.

Examples of safety processes may include, for example, stopping a vehicle that is using the three-dimensional image and/or reducing an power of the radiation used to illuminate the field of view (for example to an eye-safe level).

Determining a time delay of reflected radiation from the field of view for each pixel may comprise measuring radiation received by a sensing element corresponding to said pixel for a time period wherein the start of said time period relative to the illumination of a solid angle element corresponding to said pixel is dependent on the first image.

If an object that is larger than the threshold size is determined in the first image then there may be a time delay between the illumination of a solid angle element corresponding to said pixel and the start of the time period.

The time delay may be dependent on the size of the object that is larger than the threshold size.

In principle, the spot size of the object in the first image can indicate a distance of object. Therefore, when capturing the range information, a time delay may be introduced such that any radiation reflected by that object arrives at the sensing element before the range information is captured. This can ensure that the large amount of radiation reflected by that object, which may be incident on a large number of sensing elements, do not cause these sensing elements to saturate.

The method may further comprise forming at least one additional three-dimensional image, wherein the forming of the or each additional three-dimensional image also comprises: capturing a first image of a field of view by: illuminating the field of view with radiation; and determining an intensity of each of a plurality of pixels of reflected radiation from the field of view; subsequently capturing range information by: illuminating the field of view with radiation; and determining a time delay of reflected radiation from the field of view for each of a plurality of pixels; and forming the additional three-dimensional image wherein the additional three-dimensional image is dependent on the first image.

For example, a plurality of three-dimensional images may be formed in succession. In this way a three-dimensional moving image, movie or video can be formed, with each frame comprising a three-dimensional image. In some embodiments, a first image may be captured before each set of range information and three-dimensional images is determined. That is, a first image may be captured at the start of each frame.

The radiation used to illuminate the field of view for capturing the first image may be of lower intensity than the radiation used to illuminate the field of view for capturing the range information.

The three-dimensional image may be formed from both the captured first image and the captured range information.

Another challenge with LiDAR systems is stray light. This may comprise radiation that is emitted by a laser source of the system during illumination of the field of view and which is incident upon the sensor without having been reflected from an object within the field of view. This background signal can make it difficult to correctly identify objects within the field of view, especially in co-axial systems.

In some embodiments, the three-dimensional image is formed from the captured first image and the captured range information. For example, the first image (which may be formed when the field of view is empty) may characterize stray light for the system and may therefore be used to at least partially correct for the stray light. For example, the stray light may be compensated for by employing a readout/post-processing algorithm.

Thus, some embodiments of this disclosure provide a method of forming a three-dimensional image wherein, first, a first image of the field of view is captured (for example before the capture of a plurality of frames) and this is used in the subsequent formation of the three-dimensional images of the plurality of frames.

For example, this may take the form of a post-fabrication calibration. The first image may be formed during such a post-fabrication calibration and then may be used to correct for stray light for subsequent operation. Alternatively, a first image may be formed periodically and then subsequently used to correct for stray light until another first image is captured in a subsequent calibration process. In some embodiments, where the method is used for LiDAR system in a vehicle, a calibration process may be initiated when starting engine, for instance, to detect and correct for particles on lens.

The captured first image may contain stray light information; the three-dimensional image may be formed from the captured range information and the captured first image may be used to at least partially correct for the stray light.

The first image may be an image of a different field of view to the field of view which is used for capturing the range information.

For example, the first image may be an image of an empty field of view (i.e. such that the field of view does not contain any objects that are within range to produce a detectable reflection from the illuminating radiation that could contribute to the first image).

With such an arrangement, the first image will only contain two contributions. The first contribution is radiation that is emitted (for example by a laser source of the system) to illuminate the field of view and which is incident upon the sensor without having been reflected from an object within the field of view; this is known as stray light. The second contribution is ambient radiation (which may also be limited or completely eliminated during the capture of the first image).

The may further comprise forming at least one additional three-dimensional image. The forming of the or each additional three-dimensional image may comprises: capturing range information by: illuminating the field of view with radiation; and determining a time delay of reflected radiation from the field of view for each of a plurality of pixels; and forming the additional three-dimensional image wherein the additional three-dimensional image is dependent on the first image.

That is, in some embodiments, once the first image is captured a plurality of sets of range information and three-dimensional images may be determined. That is, a first image may be captured once and subsequently used in the forming of a plurality of frames.

The range information may be captured as a rolling shutter image.

For example, the field of view may be imaged using of the order of 1000 shots of rows or columns of pixels.

Capturing range information may comprise: for each of a plurality of rows or columns of pixels of the field of view, sequentially: illuminating a portion of the field of view corresponding to that row or column with radiation; and determining a time delay of reflected radiation from the field of view for each of a plurality of pixels in that row or column.

According to a second aspect of the present disclosure, there is provided a method of forming a three-dimensional image, the method comprising: capturing a first image of a field of view by: illuminating the field of view with radiation; and determining an intensity of each of a plurality of pixels of reflected radiation from the field of view; subsequently capturing range information by: illuminating the field of view with radiation; and determining a time delay of reflected radiation from the field of view for each of a plurality of pixels; and forming the three-dimensional image; wherein capturing the range information is dependent on the first image and the three-dimensional image is formed from the captured range information.

The method according to the second aspect may have any of the features of the method according to the first aspect.

According to a third aspect of the present disclosure, there is provided a method of forming a three-dimensional image, the method comprising: capturing a first image of a field of view by: illuminating the field of view with radiation; and determining an intensity of each of a plurality of pixels of reflected radiation from the field of view; subsequently capturing range information by: illuminating the field of view with radiation; and determining a time delay of reflected radiation from the field of view for each of a plurality of pixels; and forming the three-dimensional image; wherein the three-dimensional image is formed from the captured first image and the captured range information.

The method according to the third aspect may have any of the features of the method according to the first aspect.

According to a fourth aspect of the present disclosure, there is provided an apparatus for forming a three-dimensional image, the apparatus operable to implement the method of any one of the first, second or third aspects of the present disclosure.

The apparatus according to the fourth aspect may have any of the features of the method according to the first aspect.

The apparatus may comprise: a radiation source that is operable to emit radiation so as to illuminate a field of view; a sensor operable to measure a portion of the emitted radiation that is reflected from objects disposed in the field of view, the sensor comprising a two dimensional array of sensing elements; focusing optics arranged to form an image of the field of view in a plane of the sensor; and a controller operable to control operation of the radiation source and the sensor.

The radiation source may comprise a laser diode, which could, for example, be an edge emitter array or a vertical-cavity surface-emitting-laser (VC SEL) array. The sensor may comprise various radiation sensitive technologies, including silicon photomultipliers (SiPM), single-photon avalanche diodes (SPAD), complementary metal-oxide-semiconductors (CMOS) or charged-coupled devices (CCD).

The field of view may be divided into a plurality of pixels, each pixel corresponding to a different solid angle element. The focusing optics is arranged to focus radiation received from the solid angle element of each pixel to a different sensing element of the sensor.

The apparatus may comprise a rotatable mirror or the like and illumination of the field of view may be achieved by rotating said rotatable mirror. For example, the radiation source may be operable to illuminate only a portion of the field of view in a first direction (for example only one pixel or only one column of pixels) and rotation of the rotatable mirror may vary the position of the illuminated portion of the field of view in the first direction. For such arrangements, the radiation source may be operable to illuminate the entire field of view in a second direction that is perpendicular to the first direction (i.e. for a fixed orientation of the rotatable mirror a whole column of pixels, extending in the second direction, may be illuminated). By rotating the mirror through a sufficient range of orientations, the entire field of view may be illuminated in the first direction. With such an arrangement, a plurality of strips of the field of view can be illuminated successively.

The two dimensional array of sensing elements is arranged to receive reflected radiation from the entire field of view and the two dimensional array comprises a plurality of individually addressable rows or columns so that reflected radiation from each of a plurality of strips of the field of view can be successively measured.

In some embodiments, the apparatus may be configured such that all of the sensing elements in the two dimensional array of sensing elements can be addressed simultaneously.

In some embodiments, each sensing element in the two dimensional array of sensing elements may comprise a single-photon avalanche diode.

BRIEF DESCRIPTION OF THE DRAWINGS

In the drawings, like reference characters generally refer to the same parts throughout the different views. The drawings are not necessarily to scale, emphasis instead generally being placed upon illustrating the principles disclosed herein. In the following description, various aspects disclosed herein are described with reference to the following drawings, in which.

DETAILED DESCRIPTION

Generally speaking, the disclosure provides a method of forming a three-dimensional image that uses a two stage measurement process. As a first stage, a grayscale image of the field of view is determined. As used here, a grayscale image of the field of view is intended to mean a time-integrated intensity of radiation received by the entire sensor following illumination of the field of view by the radiation source. As a second stage, the field of view is illuminated and a time delay of reflected radiation from the field of view for each of a plurality of pixels is determined. Rather than determining a three-dimensional image of objects in the field of view only from the time delay of reflected radiation from the field of view for each of the pixels, this disclosure proposes to form the three-dimensional image from both this captured range information and the grayscale image.

Some examples of the solution are given in the accompanying figures.

Figure 1:
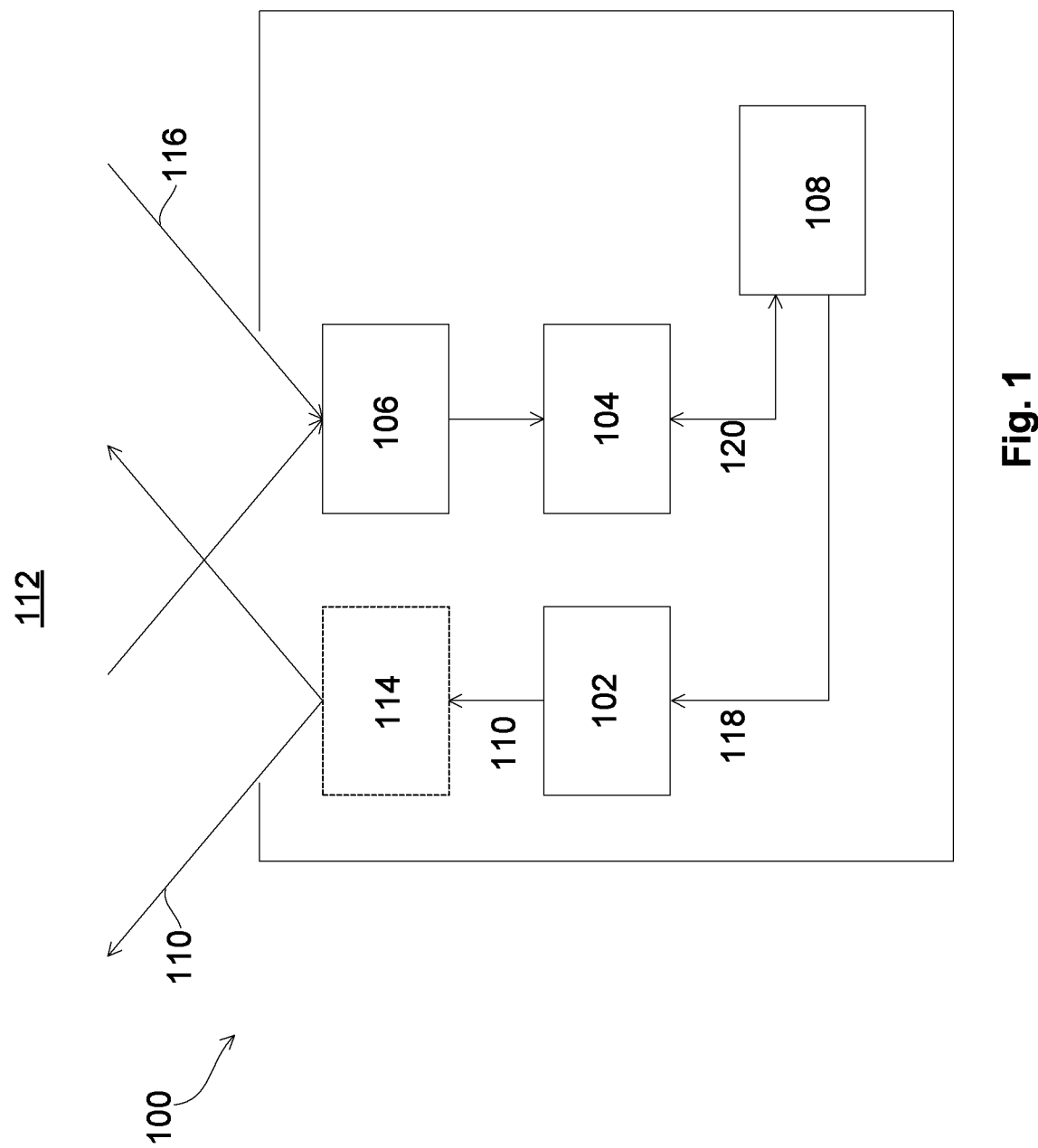
FIG. 1 is a schematic illustration of an apparatus for forming a three-dimensional image in accordance with at least one embodiment of the present disclosure.

FIG. 1 is a schematic illustration of an apparatus 100 for forming a three-dimensional image in accordance with the present disclosure. The apparatus comprises a radiation source 102, a sensor 104, focusing optics 106 and a controller 108.

The radiation source 102 is operable to emit radiation 110 so as to illuminate a field of view. The radiation source 102 may comprise a laser diode, which could, for example, be an edge emitter array or a vertical-cavity surface-emitting-laser (VC SEL) array.

The focusing optics 106 are arranged to form an image of the field of view 112 in a plane of the sensor 104. The sensor 104 is operable to measure a portion of the emitted radiation 116 that is reflected from objects disposed in the field of view 112. The sensor 104 comprises a two dimensional array of sensing elements. The sensor 104 may comprise various radiation sensitive technologies, including silicon photomultipliers (SiPM), single-photon avalanche diodes (SPAD), complementary metal-oxide-semiconductors (CMOS) or charged-coupled devices (CCD). In some embodiments, the sensor may comprise of the order of 1000 rows and of the order of 1000 columns of sensing elements (for example SPADs).

Since the focusing optics 106 form an image of the field of view 112 in a plane of the sensor 104, the two dimensional array of sensing elements divides the field of view 112 into a plurality of pixels, each pixel corresponding to a different solid angle element. The focusing optics 106 is arranged to focus radiation 116 received from the solid angle element of each pixel to a different sensing element of the sensor. In the following, the term pixel may be used interchangeably to mean either a sensing element of the sensor 104 or the corresponding solid angle element of the field of view that is focused onto that sensing element.

The controller 108 is operable to control operation of the radiation source 102 and the sensor 104, as explained further below. For example, the controller 108 is operable to send a control signal 118 to the radiation source 102 to control emission of radiation 110 therefrom. Similarly, the controller 108 is operable to exchange signals 120 with the sensor 104. The signals 120 may include control signals to the sensor 104 to control activation of sensing elements within the two dimensional array of sensing elements; and return signals containing intensity and/or timing information determined by the sensor 104.

Optionally, the apparatus 100 may comprise projection optics 114 operable to direct radiation 100 from the radiation source 102 to the field of view 112. The projection optics 114 may comprise dispersive optics. Additionally or alternatively, the projection optics 114 may comprise a rotatable mirror or the like and illumination of the field of view 112 may be achieved by rotating said rotatable mirror. For example, the radiation source 102 may be operable to illuminate only a portion of the field of view 112 in a first direction (for example only one pixel or only one column of pixels) and rotation of the rotatable mirror may vary the position of the illuminated portion of the field of view in the first direction. For such arrangements, the radiation source 102 may be operable to illuminate the entire field of view in a second direction that is perpendicular to the first direction (i.e. for a fixed orientation of the rotatable mirror a whole column of pixels, extending in the second direction, may be illuminated). By rotating the mirror through a sufficient range of orientations, the entire field of view 112 may be illuminated in the first direction. With such an arrangement, a plurality of strips of the field of view can be illuminated successively. The two dimensional array of sensing elements is arranged to receive reflected radiation from the entire field of view and the two dimensional array comprises a plurality of individually addressable rows or columns so that reflected radiation from each of a plurality of strips of the field of view can be successively measured.

Some embodiments of the present disclosure relate to new methods of forming a three-dimensional image, as discussed further below (with reference to FIGS. 2 to 7). The apparatus 100 may be generally of the same form as a number of prior art apparatus, however, the controller 108 is operable to implement these new methods (described below). In particular, the controller 108 is operable to control operation of the radiation source 102 and the sensor 104 so as to implement these new methods (described below). Furthermore, in contrast to many prior art arrangements, the sensor 104 is configured such that all of the sensing elements in the two dimensional array of sensing elements can be addressed simultaneously.

Figure 2:
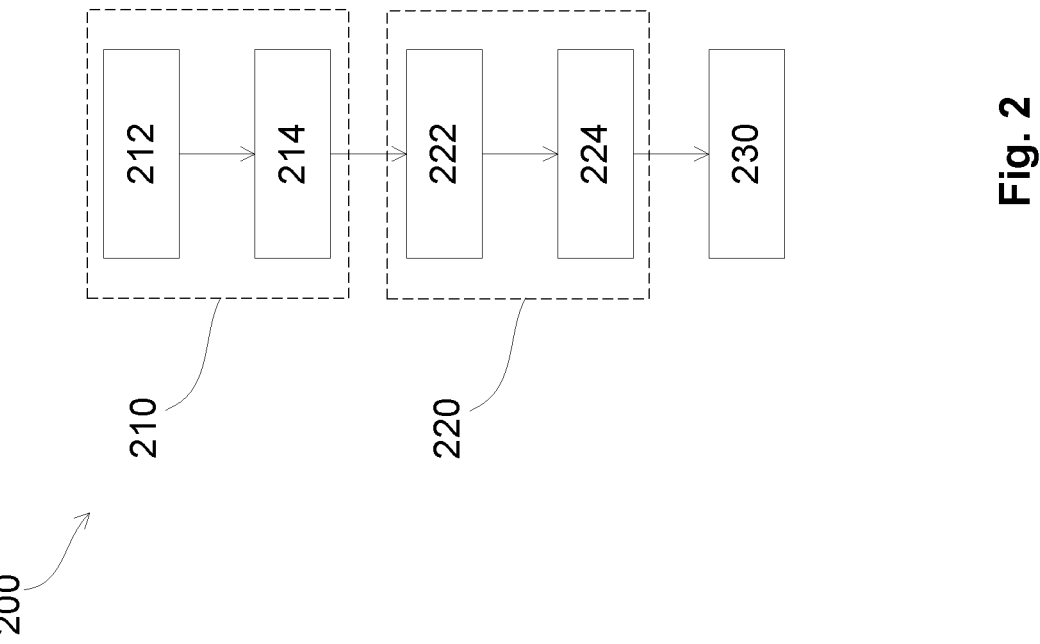
FIG. 2 is a schematic illustration of a first method of forming a three-dimensional image in accordance with the present disclosure, which may be implemented by the apparatus shown in FIG. 1.

FIG. 2 is a schematic illustration of a first method 200 of forming a three-dimensional image in accordance with the present disclosure. The method 200 comprises: capturing a first image of a field of view 210; subsequently capturing range information 220; and forming the three-dimensional image 230, wherein the three-dimensional image is dependent on the first image.

Capturing the first image of the field of view 210 comprises: illuminating the field of view with radiation 212; and determining an intensity of each of a plurality of pixels of reflected radiation from the field of view 214.

The first image of the field of view is a two-dimensional image. The first image of a field of view is a time integrated image (i.e. the first image does not contain timing information). The first image of a field of view may be referred to as a global image or a grayscale image.

Capturing the range information 220 comprises: illuminating the field of view with radiation 222; and determining a time delay of reflected radiation from the field of view for each of a plurality of pixels 224. Capturing the range information 220 may further comprise determining an intensity (in addition to a time delay of) the reflected radiation from the field of view for each of a plurality of pixels.

The method 200 shown in FIG. 2 may be for use in for a LIDAR system.

As described further below, a system (for example the apparatus 100 shown in FIG. 1) implementing the method 200 shown in FIG. 2 allows both: for saturation of sensing elements of the system to be avoided under certain conditions; and for a stray light background to be at least partially corrected for.

In some embodiments of the method 200 a plurality of three-dimensional images may be formed in succession. In this way a three-dimensional moving image, movie or video can be formed, with each frame comprising a three-dimensional image formed according to the method 200. In some embodiments, a first image may be captured (step 210) before each set of range information (step 220) and three-dimensional images (step 230) is determined. That is, a first image may be captured at the start of each frame. Alternatively, in some embodiments, once the first image is captured a plurality of sets of range information and three-dimensional images may be determined. That is, a first image may be captured once and subsequently used in the forming of a plurality of frames.

The radiation used to illuminate the fields of view (at steps 212, 222) for capturing the first image and the range information may be generated by the same radiation source (for example radiation source 102 shown in FIG. 1). The radiation used to illuminate the fields of view for capturing the first image and the range information may have the same intensity. Alternatively, the radiation used to illuminate the field of view for capturing the first image may be of lower intensity than the radiation used to illuminate the field of view for capturing the range information.

The three-dimensional image may be directly or indirectly dependent on the first image, as now explained.

In some embodiments of the method 200 shown in FIG. 2 capturing the range information (at step 220) is dependent on the first image and the three-dimensional image is formed from the captured range information, as now discussed with reference to FIG. 3. For such embodiments the three-dimensional image is indirectly dependent on the first image.

The inventors have realized that any object that is disposed in the field of view and which is sufficiently close to the apparatus 100 that is capturing the first image and the range information will be out of focus and will therefore form a large image in the first image. Furthermore, since such an object is relatively close to the apparatus that is capturing the first image and the range information, the intensity of radiation reflected from said object will, in general, be large. Therefore, the presence of such an object close to the apparatus 100 can influence a significant number of pixels and, furthermore, can cause the sensing elements for these pixels to saturate such that they are frozen while this object remains close to the apparatus.

For example, for capturing the first image and the range information, a sensor array 104 and focusing optics 106 generally of the form shown in FIG. 1 and described above may be used. The focusing optics 106 may be arranged such that the sensor array 104 is focused on a hyperfocal plane of the focusing optics 106 since such an arrangement maximizes the depth of field of the system. This may ensure that any objects that are more than half the hyperfocal distance from the focusing optics are brought to an acceptable focus.

However, any objects that are less than half the hyperfocal distance from the focusing optics will, in general, be out of focus.

For example, in some systems, if there is an object within 3 m of the focusing optics 106 this can cause a significant portion of the sensing array 104 to saturate. For example, such an object could extend across hundreds of pixels of a sensing array 104 (for example an area of the sensing array having radius of the order of tens of pixels). For some systems (for example those using an array of SPADs for determining the range information), upon receipt of a sufficiently large number of photons, the sensing elements can saturate such that the sensing element is not ready to detect a signal for the next measurement (for example the next frame). If any of the sensing elements saturate then these sensing elements are effectively frozen and, as a result, any pixels in the field of view 112 that should be detected by the saturated sensing element(s) cannot be detected. If the LiDAR is being used by an autonomous vehicle then this can result in blind spots, which are unacceptable.

However, with the method 200 of forming a three-dimensional image shown in FIG. 2 (which the controller 108 shown in FIG. 1 is operable to implement) first a first image of the field of view is captured (for example at the start of each frame, see steps 210). Furthermore, in some embodiments, this first image (captured at steps 210) is used in the subsequent capture of the range information (at steps 220). In particular, in some embodiments the first image is used to at least partially correct for the potentially large influence of objects that are close to the apparatus capturing the range information. Advantageously, this may involve delaying the monitoring of reflected radiation until the radiation reflected by the close object(s) has passed such that it does not cause parts of the sensing array 104 to saturate.

In some embodiments, the method 200 shown in FIG. 2 comprises further steps, as now described with reference to FIG. 3. FIG. 3 is a schematic illustration of a second method 300 of forming a three-dimensional image in accordance with the present disclosure. The method 300 shown in FIG. 3 comprises all of the steps of the method 200 shown in FIG. 2. The method 300 shown in FIG. 3 comprises further steps after the step of capturing the first image of a field of view 210; and before the step of subsequently capturing range information 220.

A first additional step 310 is analyzing the first image to determine the presence within the field of view of any objects that are larger than a threshold size. The step 310 of analyzing the first image to determine the presence within the field of view of any objects that are larger than a threshold size may comprise: determining any clusters of pixels of the first image that originate from a common object; determining a size of each cluster (for example based on a number of pixels in each cluster); and determining whether any such clusters are larger than a threshold size (for example a threshold number of pixels).

It will be appreciated that in the first step 310 two adjacent pixels of the first image may be identified as originating from the same object if the intensities of the two pixels are substantially the same. It will be appreciated that the criteria applied in determining whether the intensities of the two pixels are sufficiently similar so as to be identified as having originating from the same object may depend on the apparatus 100 used. For example, the criteria may be dependent upon the design and/or aberrations of the focusing optics 106 and/or the sensor 104. In one example embodiment, two adjacent pixels having intensities $I_1$ and $I_2$ may be identified as belonging to the same object if a difference between the two identities $\Delta I=|I_1-I_2|$ is less than 10% of either of the two intensities or their mean value, $<I>=(I_1+I_2)/2$. For example, the criteria may require that $\Delta I/<I>$ is less than 0.1.

The analysis of the first image in step 310 may identify any clusters of connected pixels that are identified as originating from the same object. A size of the object may be quantified by a total number of pixels over which it extends in the first image. Therefore, the threshold size may be expressed as a total number of pixels. The threshold size may be selected in dependence on the field of application. The threshold size may, for example, be dependent on the geometry of the focusing optics 106 and/or the sensor 104.

In some embodiments, for example when the method 300 is used for a vehicle, any object extending over two of more pixels may be determined to be above the threshold size. In some embodiments, for example when the method 300 is used for a vehicle, any object extending over a plurality of pixels forming a square region of the first image may be determined to be above the threshold size. For example, in some embodiments, any object extending over a 2×2 array of pixels of the first image may be determined to be above the threshold size. In another example, in some embodiments, any object extending over a 3×3 array of pixels of the first image may be determined to be above the threshold size. In yet another example, in some embodiments, any object extending over a 4×4 array of pixels of the first image may be determined to be above the threshold size.

The first step 310 may identify any clusters of pixels covering at least a threshold number of pixels of the first image (and having sufficiently similar intensities to be deemed to have originated from the same object). In some embodiments, this may sufficient to identify the presence within the field of view of an object that is larger than the threshold size. However, in some other embodiments, in order to identify the presence within the field of view of an object that is larger than the threshold size, the first step 310 may also require that the intensity of each pixel from that cluster of pixels also be above a threshold value.

The subsequent step 224 of determining a time delay of reflected radiation from the field of view for each of the plurality of pixels is dependent upon whether or not an object that is larger than the threshold size is identified in the first image. For example, the step 224 of determining a time delay of reflected radiation from the field of view for each pixel may comprise measuring radiation received by a sensing element corresponding to said pixel for a time period and wherein the start of said time period relative to the illumination of a solid angle element corresponding to said pixel is dependent on the first image. For example, in order to measure reflected radiation from the field of view for each pixel a sensing element corresponding to said pixel should be activated. For example, for many types of technology (such as, for example SPADs) activating a sensing element involves applying an appropriate biasing voltage to the sensing element. In the method 300 shown in FIG. 3, the timing of the activation of the sensing elements is dependent on whether or not an object that is larger than the threshold size is identified in the first image. For example, in the method 300 shown in FIG. 3, if an object that is larger than the threshold size is identified in the first image then the activation of the sensing elements may be delayed by a suitable time delay (relative to the illumination of a solid angle element corresponding to said pixel). However, if not objects that are larger than the threshold size are identified in the first image then the sensing elements may be activated at the same time as the illumination of a solid angle element corresponding to said pixel.

Figure 3:
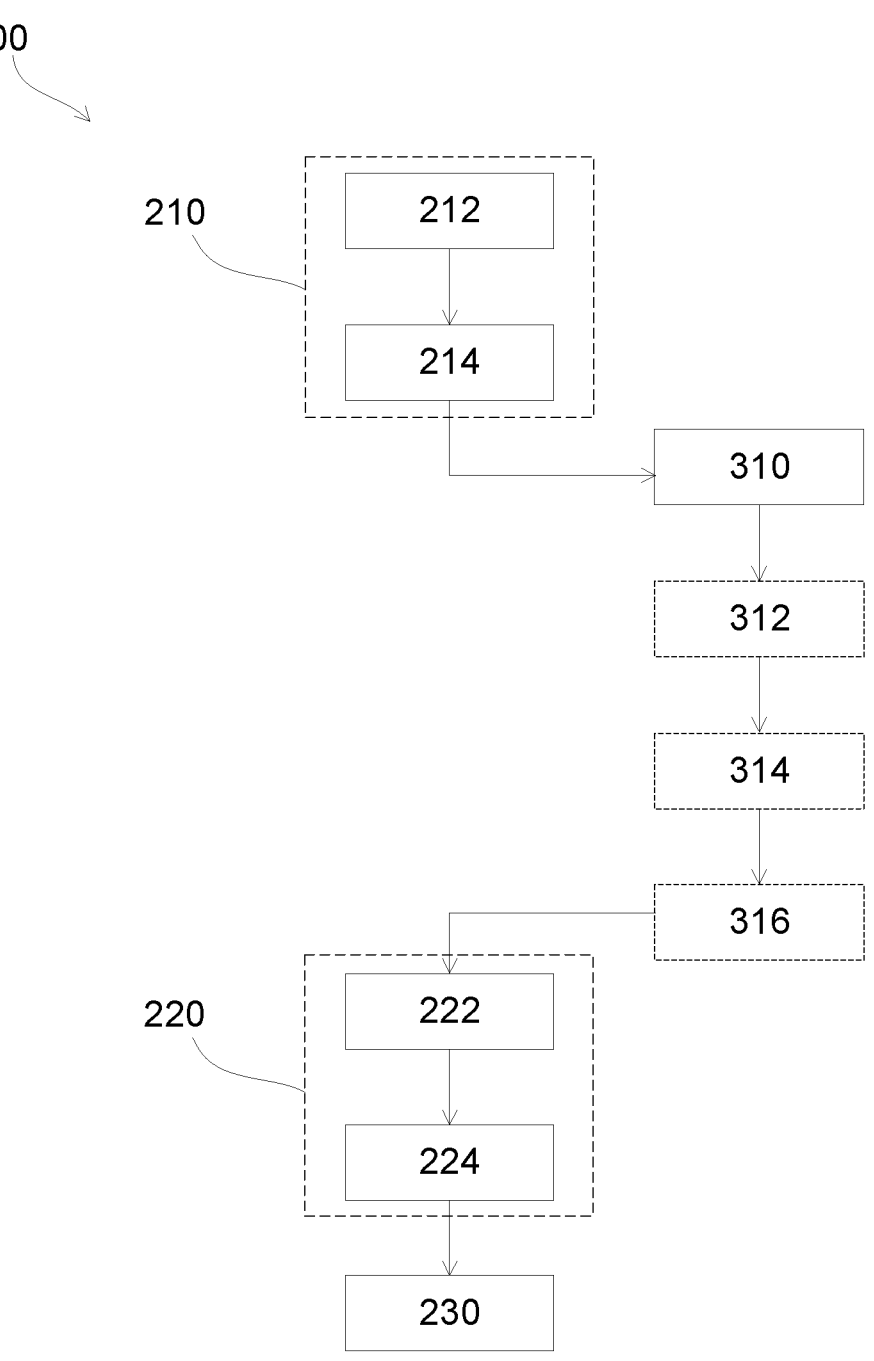
FIG. 3 is a schematic illustration of a second method of forming a three-dimensional image in accordance with the present disclosure, which may be implemented by the apparatus shown in FIG. 1.

The method 300 shown in FIG. 3 therefore differs from prior art arrangements, where typically when each pixel of the field of view is illuminated the corresponding sensing elements in the sensor are activated simultaneously. With such prior art arrangements, in the event of an object that is sufficiently close to the apparatus, a large intensity of radiation may be received by a large number of sensing elements while they are active. As a result a large portion of the sensor may saturate and may be frozen for several frames. In contrast, with the method 300 shown in FIG. 3, in the event of an object that is sufficiently close to the apparatus, an object that is larger than the threshold size is identified in the first image at step 310. As a result, the activation of the sensing elements (at step 224) may be delayed by a suitable time delay (relative to the illumination of a solid angle element corresponding to said pixel at step 222). The time delay is selected such that the reflected radiation from the close object passes through the sensing elements before they are activated. As a result, these sensing elements do not saturate and they are not frozen for several frames.

It will be appreciated that the time delays discussed above may be implemented by controller 108 via appropriate control over the control signals 118 send to the radiation source 102 to control emission of radiation 110 therefrom.

In some embodiments of the method 300 of FIG. 3, in the event of an object that is larger than the threshold size being identified in the first image then the activation of the sensing elements is delayed by a constant time delay (relative to the illumination of a solid angle element corresponding to said pixel). For example, the time delay may be dependent on a hyperfocal distance of the focusing optics 106 of the apparatus 100. For example, in some embodiments of apparatus 100, objects within 3 m of the focusing optics 106 may cause saturation of parts of the sensor 104. The reflected radiation from such an object travels of the order of 6 m, which takes of the order of 20 ns. Therefore, the sensing elements may be activated after a time delay (from illumination of the field of view 112 by the radiation source 102) of the order of 20 ns.

Alternatively, in some embodiments of the method 300 of FIG. 3, in the event of an object that is larger than the threshold size being identified in the first image then the activation of the sensing elements may be delayed by a time delay (relative to the illumination of a solid angle element corresponding to said pixel) that is dependent on the size of the object determined at step 310 (or the largest such object). For example, optionally, in some embodiments of the method 300 of FIG. 3, the method further comprises a step 312 of determining a time delay that is dependent on a size of any objects identified at step 310 as being larger than the threshold size.

In principle, the spot size of an object in the first image can indicate a distance of the object from the projection optics 106. Therefore, when capturing the range information, a time delay may be introduced such that any radiation reflected by that object arrives at the sensor 104 before the range information is captured (i.e. before the sensing elements are activated). This can ensure that the large amount of radiation reflected by that object, which may be incident on a large number of sensing elements, do not cause these sensing elements to saturate.

In some embodiments of the method 300 of FIG. 3, in the event of an object that is larger than the threshold size being identified in the first image then the activation of the all of sensing elements may be by a time delay (relative to the illumination of the field of view). Alternatively, in some embodiments of the method 300 of FIG. 3, in the event of an object that is larger than the threshold size being identified in the first image then the activation of only some of sensing elements may be by a time delay (whereas the other sensing elements may be activated simultaneously with the illumination of a solid angle element corresponding to those pixels). For example, optionally, in some embodiments of the method 300 of FIG. 3, the method further comprises a step 314 of determining a position within the field of view of any objects identified at step 310 as being larger than the threshold size. The position within the field of view of any objects identified at step 310 as being larger than the threshold size may be characterized by a list of the pixels in a cluster of connected pixels that are identified as originating from that object. For such embodiments, all pixels that correspond to a pixel of the first image that overlaps with any objects identified at step 310 as being larger than the threshold size may be activated with a time delay relative to the illumination of those pixels of the field of view. The other sensing elements may be activated simultaneously with the illumination of a solid angle element corresponding to those pixels.

In some embodiments, the step 224 of determining a time delay of reflected radiation from the field of view for each of a plurality of pixels may comprise capturing a rolling shutter image or raster scan type image for the range information wherein each row or column of the array 106 is activated sequentially to determine a strip of pixels at a time. For such embodiments, each row or column of the array is activated may be considered to be a set of pixels. For such embodiments, if an object that is larger than the threshold size is identified in the first image (at steps 310 and 312) that overlaps with any of the corresponding pixels of that row or column then a suitable time delay may be introduced for the capturing of that entire row or column of pixels.

In some embodiments of the method 300 shown in FIG. 3, the method further comprises a step 316 of: (a) generating warning signal; and/or (b) initiating a safety process, if any objects that are larger than the threshold size are identified in the first image (at step 310). Examples of safety processes may include, for example, stopping a vehicle that is using the three-dimensional image and/or reducing an power of the radiation used to illuminate the field of view (for example to an eye-safe level).

In some embodiments of the method 300 shown in FIG. 3, the radiation used to illuminate the field of view for capturing the first image (at step 212) is of lower intensity than the radiation used to illuminate the field of view for capturing the range information (at step 222). This is advantageous for a number of reasons. First, this may avoid, or at least reduce the likelihood of, saturation of the pixels of the sensor 104 while capturing the first image (at step 212). Second, this can limit a detection range of the apparatus 100 while capturing the first image (at step 212) so that only nearby targets will contribute to the first image.

The method 300 shown in FIG. 3, allows the step 224 of determining a time delay of reflected radiation from the field of view for each of the plurality of pixels to be dependent upon whether or not an object that is larger than the threshold size is identified in the first image (at step 310). Advantageously, as explained above, this can allow the first image to be used to at least partially correct for the potentially large influence of objects that are close to the apparatus capturing the range information. Other solutions for dealing with such close objects may include: reducing the intensity of the radiation used for illuminating the field of view upon saturation of part of the sensing array; or blocking of attenuating reflected radiation that re-enters the sensing system upon saturation of part of the sensing array. Compared to such known systems, the methods 200, 300 shown in FIGS. 2 and 3 (which the controller 108 shown in FIG. 1 is operable to implement) has the following advantages. First, they allow for saturation to be avoided without loss of range and/or performance that results from reducing the intensity of the radiation used for illuminating the field of view or blocking or attenuating the reflected radiation before it is incident on the sensing array. Second, in contrast to the methods 200, 300 shown in FIGS. 2 and 3, such alternative solutions cannot allow for stray light to be corrected for, which can result in false positive detections of objects in the field of view. The correction of stray light using the method according to the first aspect disclosed here is discussed further below.

In some embodiments of the method 200 a plurality of three-dimensional images may be formed in succession, as now described with reference to FIG. 4. In this way a three-dimensional moving image, movie or video can be formed, with each frame comprising a three-dimensional image formed according to the method 200.

Figure 4:
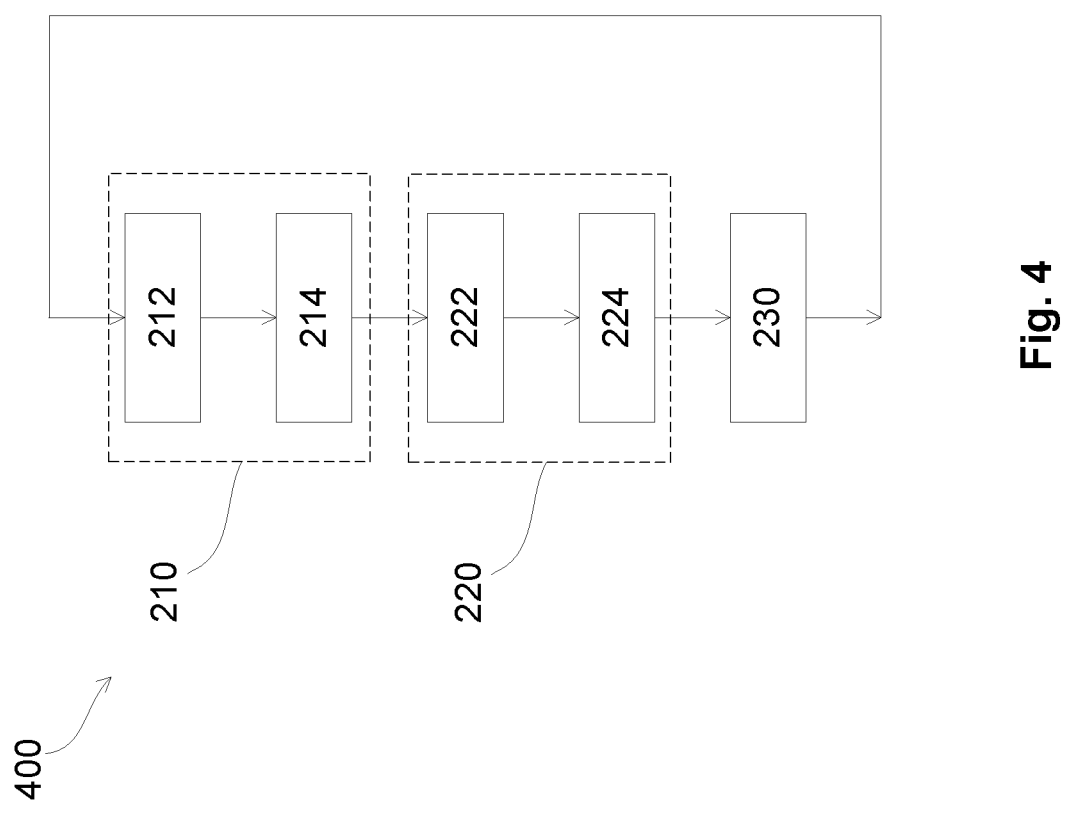
FIG. 4 is a schematic illustration of a third method of forming a three-dimensional image in accordance with at least one embodiment the present disclosure, which may be implemented by the apparatus shown in FIG. 1.

FIG. 4 is a schematic illustration of a third method 400 of forming a three-dimensional image in accordance with the present disclosure. The method 400 shown in FIG. 4 comprises all of the steps of the method 200 shown in FIG. 2. However, after a three-dimensional image is formed at step 230, the method 400 in FIG. 4 further comprises forming at least one additional three-dimensional image, wherein the forming of the or each additional three-dimensional image also comprises the steps of: capturing a first image of a field of view 210; capturing range information 220 and forming the additional three-dimensional image 230 (wherein the additional three-dimensional image is dependent on the most recently formed first image).

Embodiments of the method 300 shown in FIG. 3 may comprise forming a plurality of three-dimensional images, the method being generally of the form shown in FIG. 4.

In some embodiments of the method 200 shown in FIG. 2, the three-dimensional image is formed (at steps 230) from both the first image (captured at steps 210) and the range information (captured at steps 220).

Another challenge with LiDAR systems is stray light. This may comprise radiation that is emitted by a laser source 102 of the system during illumination of the field of view 112 and which is incident upon the sensor 104 without having been reflected from an object within the field of view 112. This background signal can make it difficult to correctly identify objects within the field of view 112, especially in co-axial systems.

In some embodiments, the three-dimensional image is formed from the captured first image and the captured range information. For example, the first image (which may be formed when the field of view is empty) may characterize stray light for the system and may therefore be used to at least partially correct for the stray light. For example, the stray light may be compensated for by employing a readout/post-processing algorithm. Such readout and/or post-processing algorithms will be known to the skilled person.

For embodiments wherein the three-dimensional image is formed (at step 230) from both the first image (captured at steps 210) and the range information (captured at steps 220), the first image (captured at steps 210) may be an image of a different field of view to the field of view which is used for capturing the range information (captured at steps 220). For example, the first image may be an image of an empty field of view (i.e. such that the field of view does not contain any objects that are within range to produce a detectable reflection from the illuminating radiation that could contribute to the first image). With such an arrangement, the first image will only contain two contributions. The first contribution is radiation that is emitted (for example by a laser source 102 of the system 100) to illuminate the field of view 112 and which is incident upon the sensor 104 without having been reflected from an object within the field of view 112; this is known as stray light. The second contribution is ambient radiation (which may also be limited or completely eliminated during the capture of the first image).

Thus, some embodiments of this disclosure provide a method of forming a three-dimensional image wherein, first, a first image of the field of view is captured (for example before the capture of a plurality of frames) and this is used in the subsequent formation of the three-dimensional images of the plurality of frames. This is now described with reference to FIG. 5.

Figure 5:
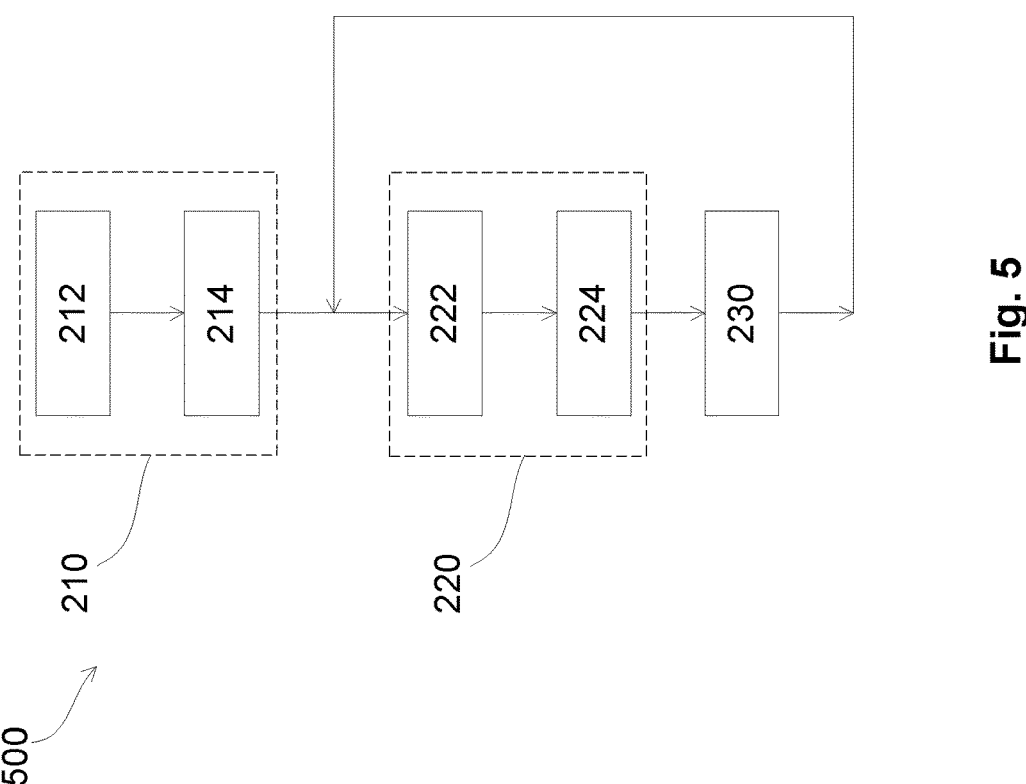
FIG. 5 is a schematic illustration of a fourth method of forming a three-dimensional image in accordance with at least one embodiment of the present disclosure, which may be implemented by the apparatus shown in FIG. 1.

FIG. 5 is a schematic illustration of a fourth method of forming a three-dimensional image in accordance with the present disclosure. The method 500 shown in FIG. 5 comprises all of the steps of the method 200 shown in FIG. 2. However, after a first three-dimensional image is formed at step 230, the method 500 in FIG. 5 further comprises forming at least one additional three-dimensional image, wherein the forming of the or each additional three-dimensional image also comprises the steps of: capturing new range information 220 and forming the additional three-dimensional image 230 (wherein the additional three-dimensional image is dependent on the most first formed first image).

That is, in some embodiments, once the first image is captured (at step 210) a plurality of sets of range information and three-dimensional images may be determined (at steps 220 and 230 respectively). That is, a first image may be captured once and subsequently used in the forming of a plurality of frames.

For example, this may take the form of a post-fabrication calibration. The first image may be formed (at steps 210) during such a post-fabrication calibration and then may be used to correct for stray light for subsequent operation. Alternatively, a first image may be formed periodically and then subsequently used to correct for stray light until another first image is captured in a subsequent calibration process. In some embodiments, where the method 500 is used for LiDAR system in a vehicle, a calibration process may be initiated when starting engine, for instance, to detect and correct for particles on lens.

It will be appreciated that the methods 400, 500 shown in FIGS. 4 and 5 are not mutually exclusive. In an alternative embodiment, a method of forming a three-dimensional image in accordance with the present disclosure may comprise a combination of the methods 400, 500 shown in FIGS. 4 and 5, as now described with reference to FIG. 6.

Figure 6:
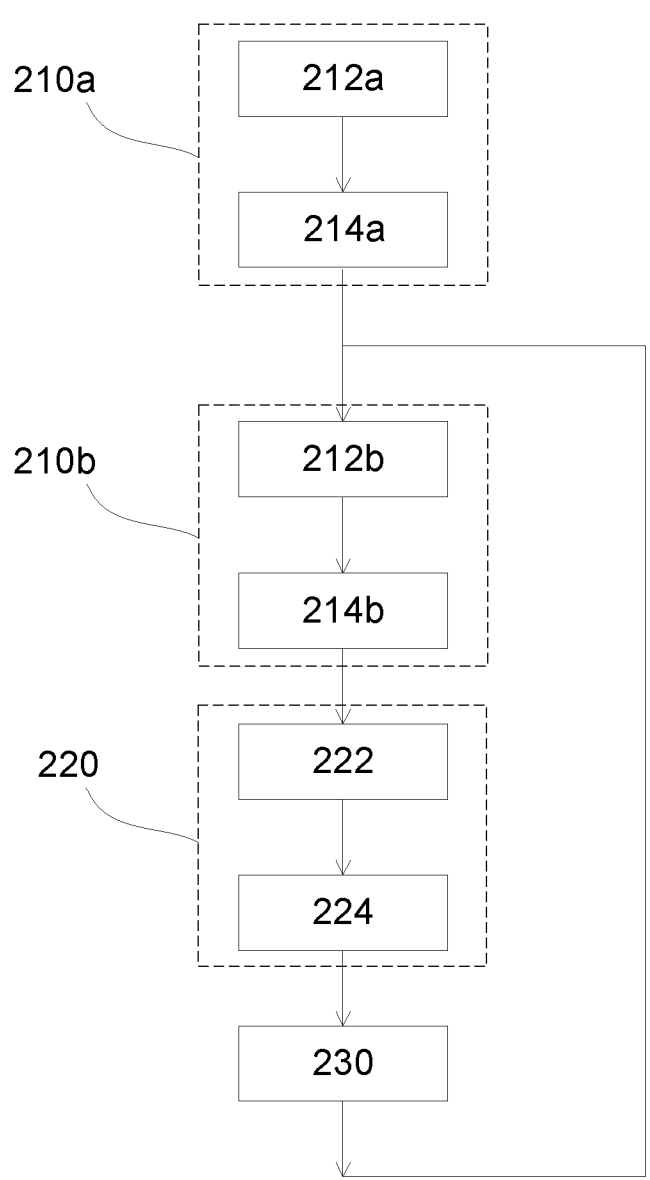
FIG. 6 is a schematic illustration of a fifth method of forming a three-dimensional image in accordance with the present disclosure, which may be implemented by the apparatus shown in FIG. 1.

FIG. 6 is a schematic illustration of a fifth method of forming a three-dimensional image in accordance with the present disclosure. The method 600 shown in FIG. 6 comprises, at an initial step 210a, an initial first image of a field of view is formed (and may, for example, be stored in memory). Capturing the initial first image of the field of view 210a comprises any of the features of capturing the first image of the field of view 210 described above. In particular, capturing the initial first image of the field of view 210a comprises: illuminating the field of view with radiation 212a; and determining an intensity of each of a plurality of pixels of reflected radiation from the field of view 214a.

After the steps 210*a* of capturing the initial first image of the field of view 210*a*, the method 600 of FIG. 6 comprises the steps 210*b* of capturing a first image of the field of view for the current frame. The step 210*b* of capturing a first image of the field of view for the current frame comprises any of the features of capturing the first image of the field of view 210 described above. In particular, capturing the first image of the field of view 210*b* for the current frame comprises: illuminating the field of view with radiation 212*b*; and determining an intensity of each of a plurality of pixels of reflected radiation from the field of view 214*b*.

Next, the method 600 shown in FIG. 6 comprises the steps 220 of capturing the range information. The steps 220 of capturing the range information may be dependent on the first image captured for the current frame (captured at steps 210*b*), as described above with reference to FIG. 3. For example, the step 224 of determining a time delay of reflected radiation from the field of view for each of the plurality of pixels may be dependent upon whether or not an object that is larger than the threshold size is identified in the first image (see step 310 of FIG. 3). Advantageously, as explained above, this can allow the first image to be used to at least partially correct for the potentially large influence of objects that are close to the apparatus capturing the range information.

Next, the method 600 shown in FIG. 6 comprises the step 230 of forming a three-dimensional image is formed. In particular, the three-dimensional image is formed (at step 230) from both the initial first image (captured at steps 210*a*) and the range information (captured at steps 220).

Once the three-dimensional image has been formed, the method returns to the steps 210*b* of capturing a first image of the field of view for the current frame and steps 210*b*, 220 and 230 are repeated. Therefore steps 210*a* may be considered to be an initial calibration step (to correct for stray light) and steps 210*b*, 220 and 230 may be considered to be the steps performed in the forming of a single frame of a plurality of frames of three-dimensional images.

Therefore, the first image captured at the start of each frame (at steps 210*b*) is used to avoid saturation of the sensor 104 (as described above with reference to FIG. 3), for example, by introducing an appropriate delay in the activation of some or all of the sensing elements of the sensor 104 when the determining a time delay of reflected radiation from the field of view for each of the plurality of pixels at step 224. In addition, the initial first image captured at the start of the method (at steps 210*a*) can be used to correct for stray light, as described above.

In any of the methods 200, 300, 400, 500, 600 described above, in steps 220 the range information may be captured as a rolling shutter image, as now described with reference to FIG. 7.

Figure 7:
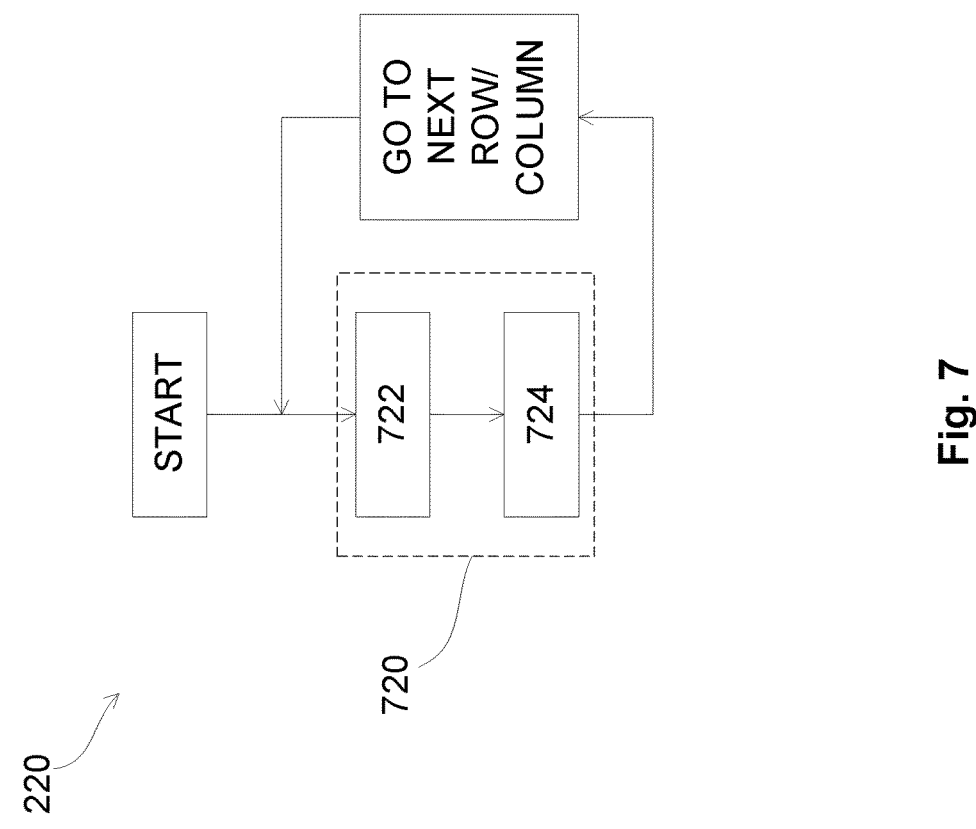
FIG. 7 shows schematically how range information may be captured as a rolling shutter image in any of the methods shown in FIGS. 2 to 6.

As shown in FIG. 7, capturing the range information may comprises sequentially performing the following steps 720 for each of a plurality of rows or columns of pixels of the field of view. The steps comprise: illuminating a portion of the field of view corresponding to that row or column with radiation 722; and determining a time delay of reflected radiation from the field of view for each of a plurality of pixels in that row or column 724. For example, the field of view 112 may be imaged using of the order of 1000 shots of rows or columns of pixels.

Embodiments of the present disclosure can be employed in many different applications including LiDAR system, for example, a LiDAR system for use in autonomous vehicles and other industries.

LIST OF REFERENCE NUMERALS

100 an apparatus for forming a three-dimensional image
102 radiation source
104 sensor
106 focusing optics
108 controller
110 radiation
112 field of view
114 projection optics
116 reflected radiation
118 control signal
120 signals
200 a first method of forming a three-dimensional image
210 capturing a first image of a field of view
212 illuminating the field of view with radiation
214 determining an intensity of each of a plurality of pixels of reflected radiation from the field of view
220 capturing range information
222 illuminating the field of view with radiation
224 determining a time delay of reflected radiation from the field of view for each of a plurality of pixels.
230 forming the three-dimensional image
300 a second method of forming a three-dimensional image
310 analyzing the first image to determine the presence within the field of view of any objects that are larger than a threshold size
312 determining a time delay that is dependent on a size of any objects identified as being larger than the threshold size
314 determining a position within the field of view of any objects identified as being larger than the threshold size
316 generating warning signal; and/or (b) initiating a safety process, if any objects that are larger than the threshold size are identified in the first image
400 a third method of forming a three-dimensional image
500 a fourth method of forming a three-dimensional image
600 a fifth method of forming a three-dimensional image
210*a* capturing an initial first image of a field of view
212*a* illuminating the field of view with radiation
214*a* determining an intensity of each of a plurality of pixels of reflected radiation from the field of view
210*b* capturing a first image of a field of view for the current frame
212*b* illuminating the field of view with radiation
214*b* determining an intensity of each of a plurality of pixels of reflected radiation from the field of view
720 steps performed for each of a plurality of rows or columns of pixels of the field of view sequentially
722 illuminating a portion of the field of view corresponding to that row or column with radiation
724 determining a time delay of reflected radiation from the field of view for each of a plurality of pixels in that row or column The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A method of forming a three-dimensional image, the method comprising:
    capturing a first image of a field of view by:
        illuminating the field of view with radiation; and
        determining an intensity of each of a plurality of pixels of reflected radiation from the field of view;
    subsequently capturing range information by:
        illuminating the field of view with radiation; and
        determining a time delay of reflected radiation from the field of view for each of a plurality of pixels; and
    forming the three-dimensional image;
    wherein the three-dimensional image is dependent on the first image,
    wherein capturing the range information is dependent on the first image and the three-dimensional image is formed from the captured range information,
the method further comprising:
    analyzing the first image to determine the presence within the field of view of any objects that are larger than a threshold size; and
    wherein determining a time delay of reflected radiation from the field of view for each of the plurality of pixels is dependent upon whether or not an object that is larger than the threshold size is identified in the first image.

2. The method of claim 1 wherein the analysis of the first image also includes determining a position within the field of view of any objects that are larger than the threshold size; and
    wherein determining a time delay of reflected radiation from the field of view for each pixel is dependent upon whether or not an object that is larger than the threshold size is identified in the first image that overlaps with the corresponding pixel of the first image or a pixel of the first image that corresponds to a row or column of pixels to which the pixel belongs.

3. The method of claim 1, further comprising: generating a warning signal if any objects that are larger than the threshold size are identified in the first image.

4. The method of claim 1, further comprising: initiating a safety process if any objects that are larger than the threshold size are identified in the first image.

5. The method of claim 1, wherein determining a time delay of reflected radiation from the field of view for each pixel comprises measuring radiation received by a sensing element corresponding to said pixel for a time period and wherein the start of said time period relative to the illumination of a solid angle element corresponding to said pixel is dependent on the first image.

6. The method of claim 5, wherein if an object that is larger than the threshold size is determined in the first image then there is a time delay between the illumination of a solid angle element corresponding to said pixel and the start of the time period.

7. The method of claim 6 wherein the time delay is dependent on the size of the object that is larger than the threshold size.

8. The method of claim 1, further comprising forming at least one additional three-dimensional image, wherein the forming of the or each additional three-dimensional image comprises:
    capturing a first image of a field of view by:
        illuminating the field of view with radiation; and
        determining an intensity of each of a plurality of pixels of reflected radiation from the field of view;
    subsequently capturing range information by:
        illuminating the field of view with radiation; and
        determining a time delay of reflected radiation from the field of view for each of a plurality of pixels; and
    forming the additional three-dimensional image wherein the additional three-dimensional image is dependent on the first image.

9. The method of claim 1, wherein the radiation used to illuminate the field of view for capturing the first image is of lower intensity than the radiation used to illuminate the field of view for capturing the range information.

10. The method of claim 1, wherein the three-dimensional image is formed from both the captured first image and the captured range information.

11. The method claim 1, of any preceding claim 1, wherein the captured first image contains stray light information; and wherein the three-dimensional image is-formed from the captured range information and the captured first image is used to at least partially correct for the stray light.

12. The method of claim 10, wherein the first image is an image of a different field of view to the field of view which is used for capturing the range information.

13. The method of claim 10, further comprising forming at least one additional three-dimensional image, wherein the forming of the or each additional three-dimensional image comprises:
    capturing range information by:
        illuminating the field of view with radiation; and
        determining a time delay of reflected radiation from the field of view for each of a plurality of pixels; and
    forming the additional three-dimensional image wherein the additional three-dimensional image is dependent on the first image.

14. The method claim 1, wherein the range information is captured as a rolling shutter image.

15. The method of claim 14 wherein capturing range information comprises:
    for each of a plurality of rows or columns of pixels of the field of view, sequentially:
    illuminating a portion of the field of view corresponding to that row or column with radiation; and
    determining a time delay of reflected radiation from the field of view for each of a plurality of pixels in that row or column.

16. An apparatus for forming a three-dimensional image, the apparatus operable to implement the method of claim 1.

17. The apparatus of claim 16, wherein the apparatus comprises:
    a radiation source that is operable to emit radiation so as to illuminate a field of view;
    a sensor operable to measure a portion of the emitted radiation that is reflected from objects disposed in the field of view, the sensor comprising a two dimensional array of sensing elements;
    focusing optics arranged to form an image of the field of view in a plane of the sensor; and
    a controller operable to control operation of the radiation source and the sensor.

18. The apparatus of claim 17 configured such that all of the sensing elements in the two dimensional array of sensing elements can be addressed simultaneously.

19. The apparatus of claim 17 wherein each sensing element in the two dimensional array of sensing elements comprises a single-photon avalanche diode.

* * * * *